United States Patent [19]

Kim

[11] Patent Number: 5,616,988
[45] Date of Patent: Apr. 1, 1997

[54] HIGH ENERGY-SAVING CIRCUIT FOR A DISPLAY APPARATUS

[75] Inventor: Hyo J. Kim, Kyoungki-do, Rep. of Korea

[73] Assignee: Hyundai Electronics Industries Co., Ltd., Kyoungki-do, Rep. of Korea

[21] Appl. No.: 454,872

[22] Filed: May 31, 1995

[30] Foreign Application Priority Data

Aug. 19, 1994 [KR] Rep. of Korea .................. 94-20524
Aug. 29, 1994 [KR] Rep. of Korea .................. 94-21446

[51] Int. Cl.$^6$ ............................................ G06F 1/32
[52] U.S. Cl. .................. 315/1; 307/31; 307/38; 345/211; 345/212; 364/492; 364/707; 395/750; 348/730
[58] Field of Search ........................ 364/707, 492; 345/211, 212, 213; 348/730; 365/227, 229; 395/750; 315/1; 307/31, 38

[56] References Cited

U.S. PATENT DOCUMENTS 4,959,594  9/1990  Ruby.
5,389,952  2/1995  Kikinis .............................. 345/212
5,483,464  1/1996  Song ................................. 364/492

FOREIGN PATENT DOCUMENTS 1-245649   9/1989  Japan.
4-293341  10/1992  Japan.

*Primary Examiner*—Robert Pascal
*Assistant Examiner*—Arnold Kinkead
*Attorney, Agent, or Firm*—Wigman, Cohen, Leitner & Myers, P.C.

[57]  ABSTRACT

A high energy-saving circuit for a display apparatus controls turn on and/or off of an AC voltage supply terminal by the simple circuitry of a sensor, an operation controller and an output unit for effecting automatic reset on an analog basis without supplying power to a microprocessor by providing an auxiliary power supply circuit in an input signal off-mode, whereby power is economized and the total AC power pauses to save the power consumed heretofore in peripheral equipment such as printers.

15 Claims, 5 Drawing Sheets

FIG. 5

| H-Sync | V-Sync | MAIN-POWER | MODE |
|---|---|---|---|
| +5V or 0V | +5V or 0V | 0 | OFF-MODE |
| +5V ⊓⊔ or +5V ⊔⊓ | +5V ⊓⊔ or +5V ⊔⊓ | 1 | ON-MODE |
| +5V ⊓⊔ or +5V ⊔⊓ | +5V or 0V | 1 | STANDBY MODE |
| +5V or 0V | +5V ⊓⊔ or +5V ⊔⊓ | 1 | STOP MODE |

HIGH ENERGY-SAVING CIRCUIT FOR A DISPLAY APPARATUS

BACKGROUND OF THE INVENTION

1. Field of the Invention

The present invention relates to a power reduction circuit of a display apparatus, and more particularly to a high energy-saving circuit of a display apparatus for effecting an automatic reset on an analog basis when receiving an input signal in an input signal off-mode to perform an associated operation without forming an auxiliary power reduction device that operates a display apparatus in the input signal off-mode.

2. Description of the Prior Art

In supplying power to display apparatuses of computer peripheral equipment, a method for supplying auxiliary power in place of main power to a microprocessor for monitor on/off control has been generally utilized to inhibit unnecessary power dissipation and save electrical power when an input signal is not received for a certain time. A power reduction circuit adopting the method is shown in FIG. 1.

Here, the power reduction circuit is operated by an operational logic in terms of the operational states of horizontal and vertical sync signals for providing data to a screen of the display apparatus via an input device. In other words, the operational logic is classified into: an input signal off-mode for producing the horizontal and vertical sync signals in a DC level when receiving no signal for a certain time, an input signal on-mode for normally producing the horizontal and vertical sync signals when receiving the input signal, an input signal standby mode for normally producing the horizontal sync signal while providing the vertical sync signal in the DC level, and an input signal stop mode for normally producing the vertical sync signal while providing the horizontal sync signal in the DC level.

That is, the main power must be supplied in the on-mode, standby mode or stop mode, but there is no need to supply the main power in the off-mode. Therefore, in order to maintain a standby state of a display output for supplying an output signal when the microprocessor for monitor on/off control monitors the receipt of an input signal in the off-mode, the main power pauses while continuously supplying the auxiliary power in the input signal off-mode to the microprocessor, thereby providing a monitor on/off control signal.

The above-described power reduction circuit is favorable for freely controlling the monitor and, further, can be effectively employed in a system embodying a display data channel system which is one method of gradually maintaining data transmission.

However, the monitor that economizes in terms of power by means of the auxiliary power results in increased cost due to adding the secondary power circuit, raising the need of power due to the operation of the secondary power circuit in the off-mode, and allowing for current flow along a degaussing coil to eliminate magnetism of a circuit connected to an AC power supply terminal and a magnetized magnetic body. Thus, power of at least 5W is wasted by the continuous supply of the power even though the input signal is not received.

A technique concerning the power reduction is suggested in U.S. Pat. No. 4,959,594 which relates to a display system having an electromagnetically deflected cathode ray tube random stroke and periodic raster display, and more particularly to a system of developing bi-directional raster scan for decreasing the power dissipated during the operation of a patch raster mode.

SUMMARY OF THE INVENTION

The present invention is devised to solve the above-described problems. Accordingly, it is an object of the present invention to provide a high energy-saving circuit for a display apparatus capable of effecting an automatic reset on an analog basis upon the receipt of an input signal in an input signal off-mode even if power is not supplied to a microprocessor.

To achieve the above object of the present invention, there is provided a high energy-saving circuit for a display apparatus including a sensor for monitoring the receipt of a horizontal sync signal and a vertical sync signal, an operation controller for converting a signal input from the sensor into a voltage of DC type for supply to an output unit, and an output unit for supplying a power control signal to an AC power supply terminal in accordance with the operation controller.

BRIEF DESCRIPTION OF THE DRAWINGS

The above objects and other advantages of the present invention will become more apparent by describing in detail preferred embodiments thereof with reference to the attached drawings in which:

FIG. 5 shows a table representing the logic per mode used for the high energy-saving circuit according to the present invention.

DETAILED DESCRIPTION OF THE PREFERRED EMBODIMENTS

Figure 2:
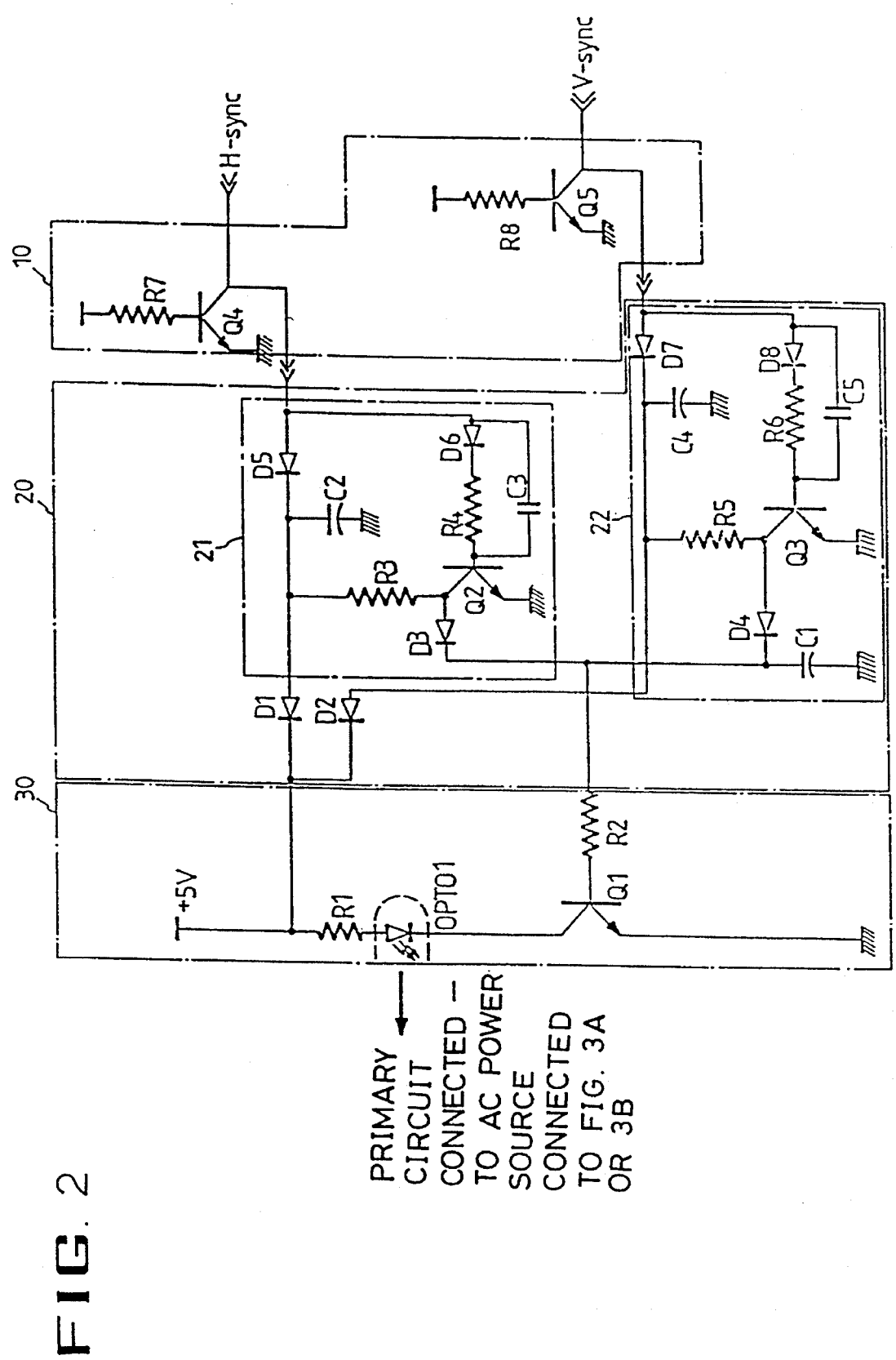
FIG. 2 is a basic construction view showing one embodiment of a high energy-saving circuit according to the present invention.

Referring to FIG. 2, a high energy-saving circuit according to the present invention will be described below.

Here, a sensor 10 includes transistors Q4 and Q5 which consist of collectors respectively connected to a horizontal sync signal H-sync and a vertical sync signal V sync for generating a monitor output signal by monitoring the input signals, bases connected to circuit stabilizing resistors R7 and R8, and emitters which are grounded. An operation controller 20 includes transistors Q2 and Q3 which consist of collectors for respectively receiving a similar DC voltage via diodes D5 and D7, capacitors C2 and C4, and resistors R3 and R5 when the horizontal and vertical sync signals are received from the sensor 10, bases for receiving the horizontal and vertical sync signals via diodes D6 and D8, resistors R4 and R6, and capacitors C3 and C5, and emitters which are grounded. By this connection, the transistors Q2 and Q3 perform switching operations in accordance with inverted waveforms so as to charge a capacitor C1 via diodes D3 and D4, the alter being commonly connected to a base of a transistor Q1 incorporated into an output unit 30 which will be described later. Additionally, the voltage of DC type is supplied via the diodes D5, D7 and capacitors C2 and C4 and commonly connected diodes D1 and D2 to a collector of the transistor Q1 of the output unit 30. The output unit 30 includes the transistor Q1, the base of which receives a signal via the commonly connected diodes D3 and D4 in the operation controller 20 and via a circuit-stabilizing resistor R2 for performing the switching operation that supplies the voltage signal of DC type via the diodes D1 and D2 commonly connected in the operation controller 20 prior to being input to the collector thereof via a resistor R1 and a photo-coupler OPTO2 to an AC power voltage terminal. Furthermore, an output operator 40' shown in FIG. 3B interlinked to a light-emitting portion of the photo-coupler OPTO1 is formed of a triac and a gate trigger voltage source of the triac for permitting a light-receiving portion Q9 of the photo-coupler OPTO1 to turn on/off an AC input.

The operation controller 20 can be divided into a first switch 21 and a second switch 22, in which the first switch 21 includes the diode D6, capacitor C3 and resistor R4 for supplying bias to the transistor Q2 upon the receipt of the horizontal sync signal, and the diodes D5 and D3, resistor R3 and capacitor C2 for making the horizontal sync signal have a DC characteristic to supply it to the output unit 30. Also, the second switch 22 includes the diode D8, capacitor C5 and resistor R6 for supplying bias to the transistor Q3 upon the receipt of the vertical sync signal, and the diodes D7 and D4, resistor R5 and capacitors C1 and C4 for making the vertical sync signal have a DC characteristic to supply it to the output unit 30.

Figure 3A:
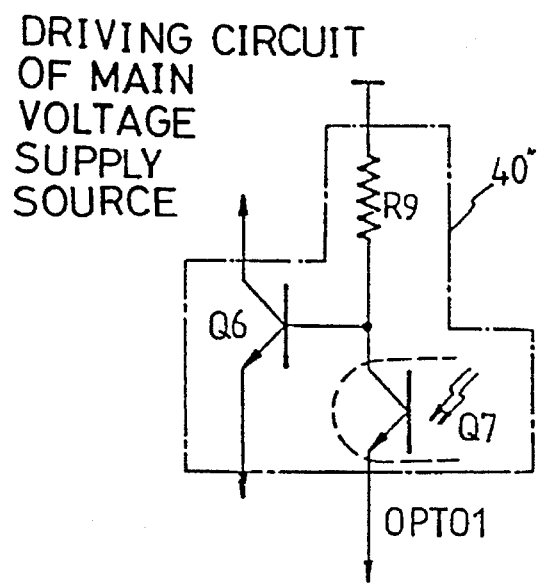
FIGS. 3A and 3B are views to which one embodiment of the high energy-saving circuit according to the present invention is applied.
Figure 3B:
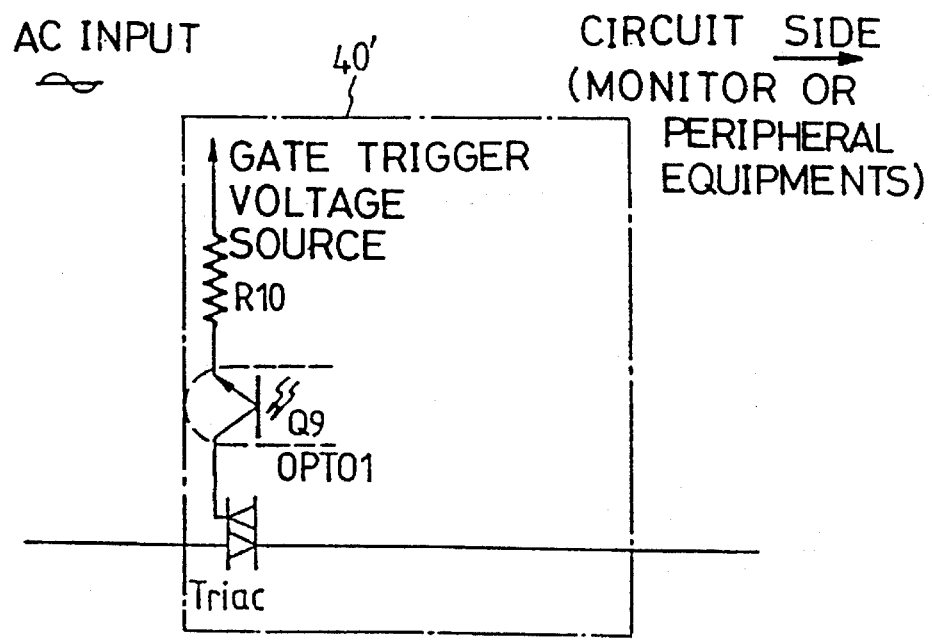

Briefly, the high energy-saving circuit according to the present invention is formed by the sensor 10, operation controller 20, output unit 30, and output operator 40' shown in FIG. 3B or 40" shown in FIG. 3A. Here, the output operator 40" has an auxiliary power switching transistor Q6, and a light-receiving transistor Q7 for supplying bias to the transistor Q6 and being associated with the light-emitting portion of the photo-coupler OPTO1.

FIGS. 3A and 3B illustrate the output operators 40" and 40', respectively.

Referring to FIG. 3A, the output operator 40" is constructed in such a manner that the light-receiving transistor Q7 associated with the light-emitting portion of the photo-coupler OPTO1 in the output unit 30 is connected to a resistor R9 and to a base of the transistor Q6, thereby turning on/off a driving circuit of a main voltage source connected to a collector of the transistor Q6.

Referring to FIG. 3B, the output operator 40' is constructed in such a manner that the light-receiving transistor Q9 associated with the light-emitting portion of the photo-coupler OPTO1 in the output unit 30 is connected to the gate of the triac and to the gate trigger voltage source via a resistor R10.

In the high energy-saving circuit according to the present invention formed as above, the horizontal sync signal H-sync or vertical sync signal V-sync supplied to the sensor 10 insulated from an AC input line as shown in FIG. 2, which is named as a secondary circuit, is input to the operation controller 20 when required in a video port of a computer. At this time, the horizontal and vertical sync signals supply a smooth DC voltage to the collectors of the transistors Q2 and Q3 by connecting resistors R3 and R5 via respective diodes D5 and D7. Simultaneously, the horizontal and vertical sync signals (assuming on-mode as in FIG. 5) passing through the diodes D6 and D8 drive the transistors Q2 and Q3 and cause them to perform switching operations.

Since the emitters of the transistors Q2 and Q3 are grounded as a common collector and each of the horizontal and vertical sync signals is of a pulse, the periodically high level waveforms (in fact, the similar DC voltage level through a group of a diode D5, condenser C2 and resistor R3) inverted during the switching operation charge up the capacitor C1 via the diodes D3 and D4 in the case that each pulse level in the sync signals is low level. Successively, the transistor Q1 is supplied with the charged voltage which is biased by the resistor R2 to be turned on.

Consequently, the voltage of DC characteristic supplied to the diodes D1 and D2 drives the light-emitting portion of the photo-coupler OPTO1 via the resistor R1. However, as the horizontal and vertical sync signals have fixed levels, transistors (Q2, Q3) (Q1) are sequentially turned to the off state.

Figure 4:
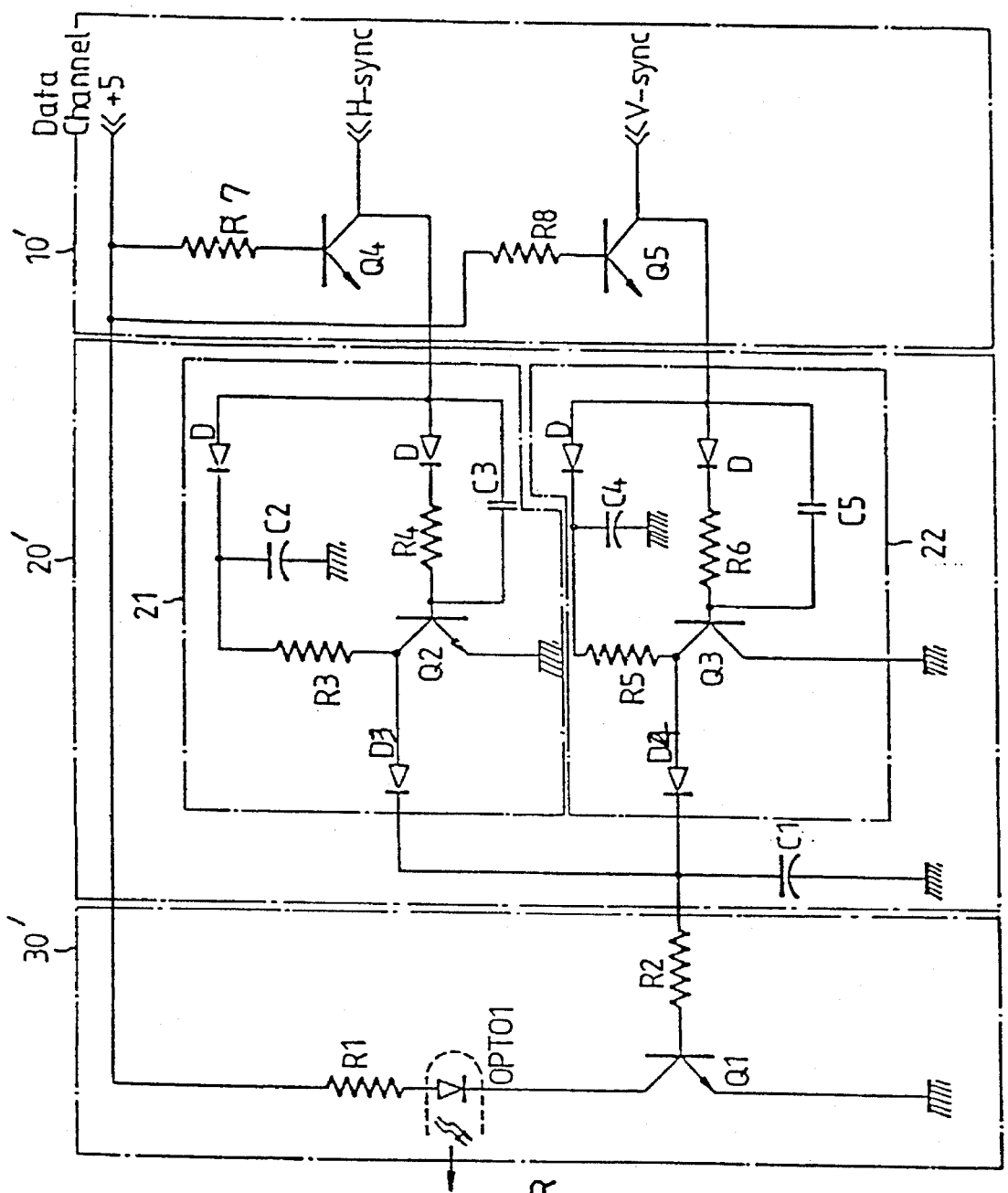
FIG. 4 shows another embodiment of the high energy-saving circuit according to the present invention.

FIG. 4 shows another embodiment of the high energy-saving circuit according to the present invention, in which a power voltage for driving a circuit of a display data channel system is shifted to drive a microprocessor for monitor on/off control.

More specifically, a sensor 10' corresponding to the sensor 10 of FIG. 2 receives respective data horizontal and vertical sync signals while receiving a data channel power voltage from a hard disc of a computer. An operation controller 20' corresponding to the operation controller 20 is formed by a first switch 21 having a transistor Q2 which is turned on by receiving the horizontal sync signal and a second switch 22 having a transistor Q3 which is turned on by receiving the vertical sync signal, thereby supplying an output via commonly connected diodes D3 and D4. Also, an output unit 30' corresponding to the output unit 30 includes a transistor Q1 which turns on the light-emitting portion of the photo-coupler OPTO1 by means of the data channel power voltage supplied to a collector thereof when the operation controller 20' is turned on, thereby operating the output operator 40' which is interlinked to the light-emitting portion of the photo-coupler OPTO1 to make the light-receiving portion of the photo-coupler OPTO1 turn on/off the AC input at one end of a primary circuit of the AC input side by being connected to the gate of the triac; or operating the output operator 40" formed of the auxiliary power switching transistor Q6 and light-receiving transistor Q7 which is interlinked to the light-emitting portion of the photo-coupler OPTO1 for supplying the bias to the transistor Q6.

In the high energy-saving circuit according to the present invention formed as shown in FIG. 4, the horizontal sync signal H-sync or vertical sync signal V-sync supplied to the sensor 10' insulated from the AC input line, which is named as a secondary circuit, is input to the operation controller 20' when required in the video port of the computer. Here, the data channel supply power voltage supplied to the sensor 10' provides a bias voltage to overall circuitry. At this time, the horizontal and vertical sync signals supply a smooth DC voltage to the collectors of the transistors Q2 and Q3 by connecting resistors R3 and R5 via respective diodes D5 and D7. Simultaneously, the horizontal and vertical sync signals passing through the diodes D6 and D8 drive the transistors Q2 and Q3 and cause them to perform switching operations. Since the emitters of the transistors Q2 and Q3 are grounded, the waveforms inverted during the switching operation charge up the capacitor C1 via the diodes D3 and D4 such as in FIG. 2. Successively, the transistor Q1 is supplied with the charged voltage biased by the resistor R2 to be turned on.

Consequently, the data channel supply power voltage supplied to the sensor 10' drives the light-emitting portion of the photo-coupler OPTO1 via the resistor R1.

The operational logic of the horizontal and vertical sync signals in the present invention is represented in FIG. 5 of the Vesa or NYUTEK system, and the output operator shown in FIG. 3 is operated in accordance with the operational logic.

Figure 1:
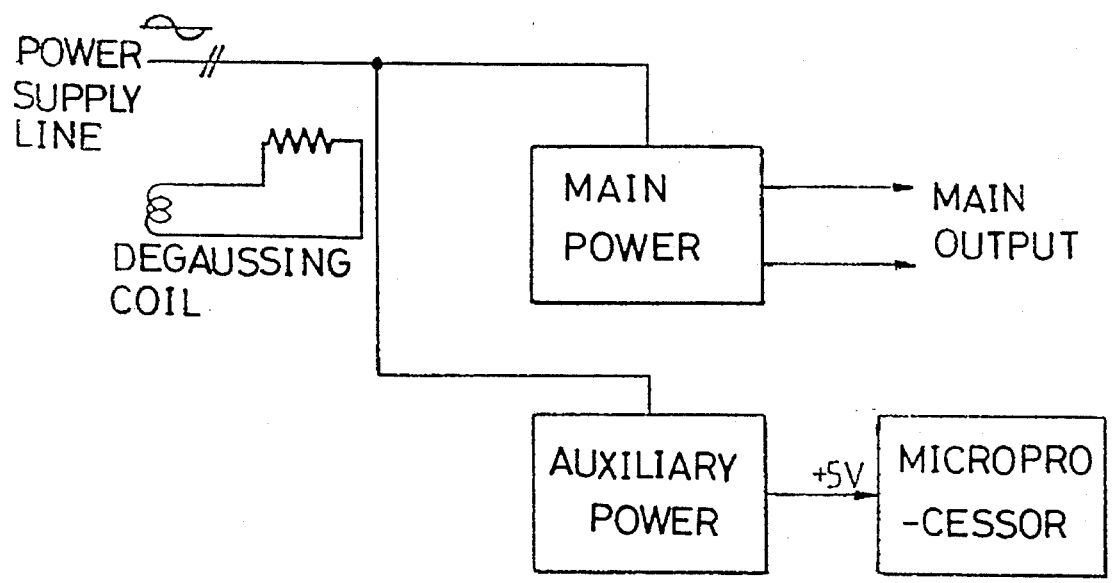
FIG. 1 is a construction view showing a conventional power reduction circuit of a monitor.

Especially, the output operator 40" of FIG. 3A controls the driving circuit of the main power shown in FIG. 1 by supplying power to the driving circuit of the main power only when a signal of the light-receiving portion Q7 of the photo-coupler OPTO1 exists. As a result, the power for controlling the microprocessor is not continuously demanded in the off-mode to economize the high energy-saving circuit as much as possible.

Moreover, the output operator 40' of FIG. 3B embodied in the AC input stage supplies AC power to the circuit (the monitor circuit, peripheral equipment, printer, etc.) because the gate of the triac is driven upon the turn on of the light-receiving portion Q9 successively to the light-emitting portion of the photo-coupler OPTO1 of the output units 30 or 30'.

In other words, the output operator 40 is driven via the operation controller 20 and output unit 30 only when the horizontal and vertical sync signals are supplied through the sensor 10 to supply AC power to the circuit side (i.e., the monitor or peripheral equipments) according to one embodiment of the high energy-saving circuit as shown in FIG. 2. In accordance with another embodiment of the invention as shown in FIG. 4, the output operator 40' is driven via the operation controller 20' and output unit 30' only when the horizontal and vertical sync signals are supplied through the sensor 10' while providing the bias of the overall circuitry as the data channel supply power to supply the AC power to the circuit side (i.e., the monitor or peripheral equipments) Therefore, the primary circuit (AC input side) is controlled to pause in the off-mode to maintain the power below 1[W], so that the power can be saved.

In addition, power of approximately 3[W] has been dissipated by both the monitor and printer in an energy-saving mode when turning on a dot printer in view of the conventional system. However, there is no need to form the secondary power circuit according to the present invention, which considerably cuts down the cost as such.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A high energy-saving circuit for a display apparatus comprising:

a sensing portion for receiving a horizontal sync signal and a vertical sync signal respectively supplied from a computer;

an operation-controlling circuit portion including a first switch having a first transistor turned on upon the receipt of said horizontal sync signal from said sensing portion, and a second switch having a second transistor turned on upon the receipt of said vertical sync signal, said first and second switches having a common output;

an output portion including a third transistor for turning on a light-emitting portion of a photo-coupler when said operation-controlling circuit portion is turned on; and an output operating portion connected to a gate of a triac and being interlinked to said light-emitting portion of said photo-coupler for allowing a light-receiving portion of said photo-coupler to selectively turn on and off an AC input at one end of a primary circuit of one of a monitor and peripheral equipment;

whereby said high energy-saving circuit controls the power of said primary circuit of said one of said monitor and said peripheral equipment;

wherein a data channel power voltage from a hard disc of said computer is directly supplied to a collector of said third transistor for turning on said light-emitting portion of said photo-coupler.

2. A high energy-saving circuit for a display apparatus comprising:

a sensing portion for receiving a horizontal sync signal and a vertical sync signal respectively supplied from a computer;

an operation-controlling circuit portion including a first switch having a first transistor turned on upon the receipt of said horizontal sync signal from said sensing portion, and a second switch having a second transistor turned on upon the receipt of said vertical sync signal, said first and second switches having a common output;

an output portion including a third transistor for turning on a light-emitting portion of a photo-coupler when said operation-controlling circuit portion is turned on; and an output operating portion including a fourth transistor for controlling a driving circuit of a main power source, and a light-receiving transistor interlinked with said light-emitting portion of said photo-coupler for supplying bias to said fourth transistor;

wherein a data channel voltage from a hard disc of said computer is directly supplied to a collector of said third transistor for turning on said light-emitting portion of said photo-coupler.

3. A high energy-saving circuit for a display apparatus as claimed in claim 1, wherein said output operating portion has a light-receiving transistor which is interlinked to said light-emitting portion of said photo-coupler in said output portion and which is connected to a gate of a triac and to a trigger power source via a resistor, said triac being controlled by the on and off operation of said photo-coupler, and the AC input being supplied to said one of said monitor and said peripheral equipment by said triac.

4. A high energy-saving circuit for a display apparatus as claimed in claim 1, wherein said first switch includes a diode, a capacitor and a resistor for supplying bias to said first transistor upon the receipt of said horizontal sync signal, and said first switch includes further diodes, a further resistor and a further capacitor for allowing said horizontal sync signal to have DC characteristics.

5. A high energy-saving circuit for a display apparatus as claimed in claim 2, wherein said first switch includes a diode, a capacitor and a resistor for supplying bias to said first transistor upon the receipt of said horizontal sync signal, and includes further diodes, a further resistor and a further capacitor for allowing said horizontal sync signal to have DC characteristics.

6. A high energy-saving circuit for a display apparatus as claimed in claim 1, wherein said second switch includes a diode, a capacitor and a resistor for supplying bias to said second transistor upon the receipt of said vertical sync signal, and said second switch includes further diodes, a further resistor and further capacitors for allowing said vertical sync signal to have DC characteristics.

7. A high energy-saving circuit for a display apparatus as claimed in claim 2, wherein said second switch includes a diode, a capacitor and a resistor for supplying bias to said second transistor upon the receipt of said vertical sync signal, and includes further diodes, a further resistor and further capacitors for allowing said vertical sync signal to have DC characteristics.

8. A high energy-saving circuit for a display apparatus, comprising:

sensing means for receiving a horizontal sync signal and a vertical sync signal respectively supplied from a computer in accordance with a selecting driving mode;

operation controlling means for controlling operation of said high energy-saving circuit, and including a first switch having a first transistor biased upon receipt of said horizontal sync signal from said sensing means, and a second switch having a second transistor biased upon receipt of said vertical sync signal, said first and second switches having a common output;

output means including a third transistor for turning on a light-emitting portion of a photo-coupler when said operation controlling means is turned on; and output operating means connected to a gate of a triac and interlinked to said light-emitting portion of said photo-coupler for allowing a first light-receiving portion of said photo-coupler to selectively turn on and off an AC input at one end of a primary circuit of one of a monitor and peripheral equipment;

wherein said high energy-saving circuit controls the power of said primary circuit of said one of said monitor and said peripheral equipment, and wherein each of said sensing means, said operation controlling means, said output means and said output operating means is initially operated to change from an off mode to a driving mode exclusively in response to said horizontal sync signal and said vertical sync signal, whereby no standby voltage is required.

9. A high energy-saving circuit for a display apparatus as recited in claim 8, wherein a data channel power voltage from a hard disk of said computer is directly supplied to a collector of said third transistor for turning on said light-emitting portion of said photo-coupler, and wherein said third transistor is biased exclusively by the common output of said operation controlling means.

10. A high energy-saving circuit for a display apparatus as recited in claim 9, wherein said output operating means includes a first light-receiving transistor connected to a gate of a triac and interlinked to said light-emitting portion of said photo-coupler, and a trigger power source comprising one input of said AC input and connected to a resistor controlled by an on and off operation of said photo-coupler, said AC input having a second input supplied to said one of said monitor and said peripheral equipment by said triac.

11. A high energy-saving circuit for a display apparatus as recited in claim 9, wherein said first switch includes a first group comprising a diode, a capacitor and a resistor for supplying bias to said first transistor upon receipt of said horizontal sync signal, and a second group comprising further diodes, a further resistor and a further capacitor for allowing said horizontal sync signal to have DC characteristics.

12. A high energy-saving circuit for a display apparatus as recited in claim 9, wherein said second switch includes a third group comprising a diode, a capacitor and a resistor for supplying bias to said second transistor upon receipt of said vertical sync signal, and a fourth group comprising further diodes, a further resistor and further capacitors for allowing said vertical sync signal to have DC characteristics.

13. A high energy-saving circuit for a display apparatus as recited in claim 8, wherein said output operating means includes a first light-receiving transistor connected to a gate of a triac and interlinked to said light-emitting portion of said photo-coupler, and a trigger power source comprising one input end of said AC input and connected to a resistor controlled by an on and off operation of said photo-coupler, said AC input having a second input end supplied to said one of said monitor and said peripheral equipment by said triac.

14. A high energy-saving circuit for a display apparatus as recited in claim 8, wherein said first switch includes a first group comprising a diode, a capacitor and a resistor for supplying bias to said first transistor upon receipt of said horizontal sync signal, and a second group comprising further diodes, a further resistor and a further capacitor for allowing said horizontal sync signal to have DC characteristics.

15. A high energy-saving circuit for a display apparatus as recited in claim 8, wherein said second switch includes a third group comprising a diode, a capacitor and a resistor for supplying bias to said second transistor upon receipt of said vertical sync signal, and a fourth group comprising further diodes, a further resistor and further capacitors for allowing said vertical sync signal to have DC characteristics.

* * * * *